HIZER & CRAWFORD.
Thrashing Machine.
No. 3,136.
2 Sheets—Sheet 1.
Patented June 14, 1843.
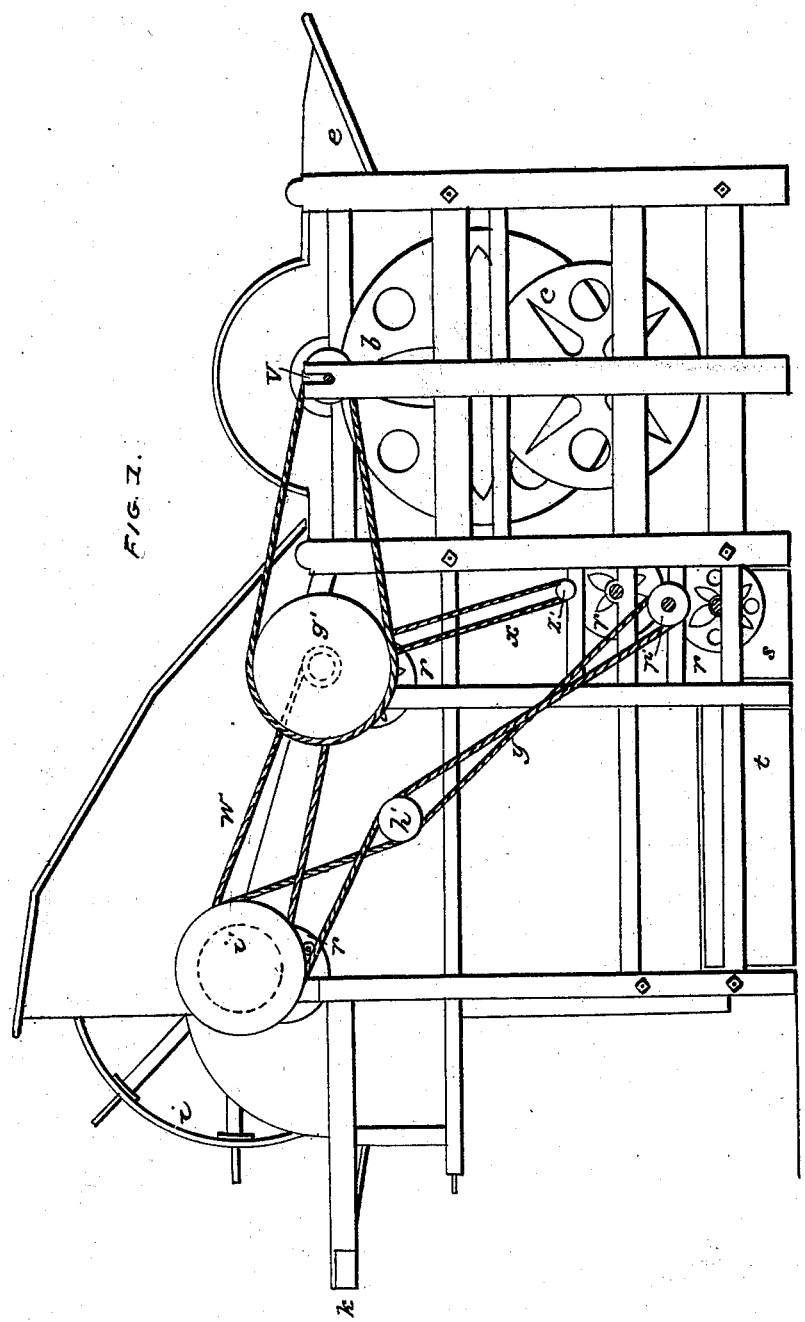

HIZER & CRAWFORD.
Thrashing Machine.
No. 3,136.
2 Sheets—Sheet 2.
Patented June 14, 1843.
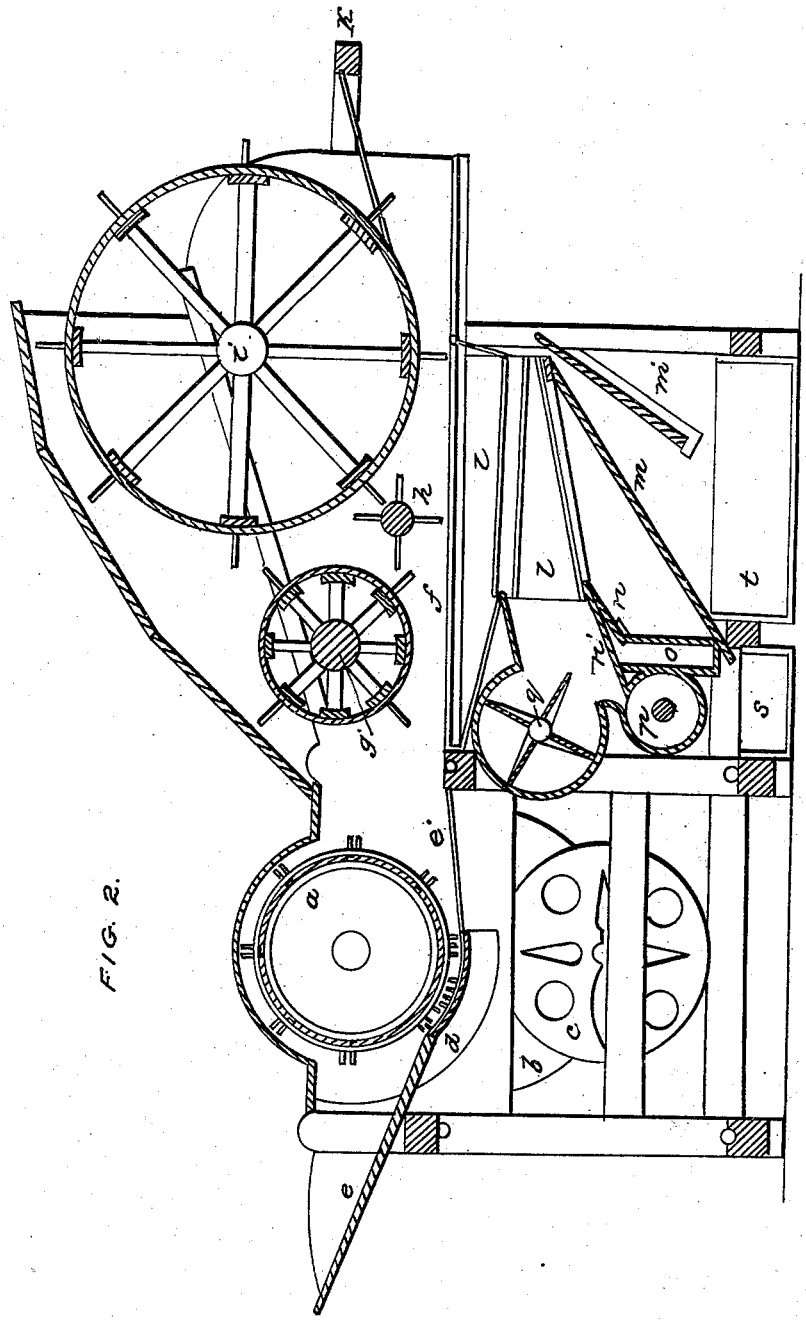

UNITED STATES PATENT OFFICE.

H. HIZER AND A. B. CRAWFORD, OF WOOSTER, OHIO.

THRESHING-MACHINE.

Specification of Letters Patent No. 3,136, dated June 14, 1843.

*To all whom it may concern:*

Be it known that we, H. HIZER and A. B. CRAWFORD, of Wooster, in the county of Wayne and State of Ohio, have invented a new and useful Improvement in Machines for Threshing and Cleaning Grain; and we do hereby declare that the following is a full, clear, and exact description thereof, reference being had to the accompanying drawing, which forms a part of this specification, Figure 1 of which is a geometrical side elevation; Fig. 2, a vertical longitudinal section.

The nature of our invention consists in combining with the cylinder threshing machine a straw carrier, which shall separate all the grain from the straw; and in connection therewith combining a wheat fan and smut machine; the whole of the running gear being suspended on friction rollers so as to be moved with the least possible power.

In constructing our machine an oblong frame is formed, of suitable dimensions to hold the machinery hereafter described. The threshing cylinder (*a*) is of metal, the outside being formed in staves, the edges of which are rabbeted, and overlap each other; the teeth are inserted into this cylinder, similar to many now in common use. The gudgeons are made to run on large friction wheels (*b*) the axes of which bear on friction wheels (*c*) below them. The concave (*d*) is also of metal, and armed with teeth; a feed board (*e*) conducts the grain onto it under the cylinder; on the opposite side a spout (*e'*) leads onto a horizontal wire screen (*f*) which is stationary; over this screen, near the threshing cylinder, there is a light cylinder armed with rows of teeth, which forms a revolving rake (*g*) of about the same diameter, as the threshing cylinder, for the purpose of carrying forward the straw from the threshing cylinder. Just beyond the rake (*g*), there is a small rake (*h*) which is made to revolve in a direction the reverse of rake (*g*) and beyond that another rake (*i*) of about twice the diameter of that first named, and revolving in the same direction, is placed the teeth on the lower side of all of them being on the same plane and nearly coming in contact with the horizontal screen. These rakes serve to carry the straw off and shake it up so as to clear the grain from it. To prevent the straw from being carried around over the last rake (*i*) a cross piece (*k*) of the frame stands in front of it, with teeth projecting in toward the rake.

To the under side of the stationary horizontal screen a shaking-shoe (*l*) is suspended, which is coupled by means of a connecting rod and bell crank with a crank on the axle of the rake (*i*) by which the shoe is vibrated. This part of the apparatus is similar in construction to that in common use in winnowing machines; and, being well known to the manufacturer, is not represented in the drawing. The screen board is represented at (*m*) and the tail board at (*m'*).

The grain after falling from the stationary screen upon those in the shoe and being freed from chaff, &c., is conducted from it, by means of an inclined board (*n*) into the spout (*o*) placed nearly at the bottom of the frame under the rake (*g*) which spout conveys the grain out of the machine on one side when the inclined board (*n'*) is not in place; but when this board is put in the position shown in the drawing, it extends from the shoe over the spout (*o*) and carries the grain into the smut machine (*p*) situated just beyond it in a horizontal position, from which the grain is discharged by a spout parallel with and beside the spout (*o*). A fan of ordinary construction marked (*q*) is situated over the smut apparatus, which gives wind to the shoe. The gudgeons of the rakes fan &c. can be made to run on friction rollers (*r*) if desired, or in boxes of the ordinary form. Under the screen board (*m*) a small box (*s*) is placed to receive the screenings and under the tailboard (*m'*) there is a larger box for the "tailings."

The machine is connected with the driving power and belted as follows: On one of the journals of the threshing cylinder there is a pulley which has a belt (*u*) connecting it with the driving power. On the other journal of this cylinder there is also a pulley (*v*) from which an endless belt runs onto a pulley (*g'*) on the axis of the first described rake (*g*); inside pulley (*g'*) a smaller one drives a band (*w*) which connects it with a pulley on the axle of the rake (*i*) between the pulley (*i'*) and the frame; the last named pulley being connected with the double pulley ($h'$) on the axle ($h$) and another cross band ($y$) runs from that to one marked ($p'$) on the axis of the smutter. An open band ($x$) extends down from a pulley on the axis of rake ($g$) to the one ($z'$) on the fan shaft. The pulleys above described are so proportioned as to cause the periphery of the rake ($g$) to move a little slower than rake ($h$) and this latter to have less motion than rake ($i$) this serves to free the machine from straw without clogging. The other pulleys are reduced enough to give sufficient speed to the parts they move.

What we claim as our invention and desire to secure by Letters Patent, is—

The combination of the rakes ($g$, $h$, and $i$) for carrying off the straw, and stirring it up, in the manner specified; we also claim in combination therewith the horizontal stationary screen ($f$) arranged in the manner and for the purpose herein described.

HENRY HIZER.
A. B. CRAWFORD.

Witnesses:
 WM. McCURDY,
 JOSEPH McCURDY.